United States Patent [19]

Yanai et al.

[11] Patent Number: 5,327,729
[45] Date of Patent: Jul. 12, 1994

[54] SIMPLIFIED APPARATUS FOR PRODUCING LIQUID NITROGEN

[75] Inventors: Masayoshi Yanai; Etsuji Kawaguchi; Yukiya Sugasaki; Tsuyoshi Kanegae; Bungo Kondo, all of Moriyama, Japan

[73] Assignees: Iwatani Sangyo Kabushiki Kaisha; Iwatani Plantech Corporation, both of Osaka, Japan

[21] Appl. No.: 5,818

[22] Filed: Jan. 19, 1993

[51] Int. Cl.[5] ............................................. F25J 1/00
[52] U.S. Cl. ..................................... 62/9; 62/47.1; 62/49.1; 95/54
[58] Field of Search ................... 62/8, 9, 11, 49.1; 95/52, 54

[56] References Cited

U.S. PATENT DOCUMENTS 3,442,091  5/1969  Klipping et al. ............... 62/49.2
4,369,636  1/1983  Purcell et al. .................. 62/49.2

FOREIGN PATENT DOCUMENTS 2-131189  10/1990  Japan .
3-156279  7/1991  Japan .

Primary Examiner—Ronald C. Capossela
Attorney, Agent, or Firm—Bacon & Thomas

[57] ABSTRACT

In an apparatus for producing liquid nitrogen by supplying to a nitrogen gas separated from the atmosphere and then purified by an air separating device (4) into an insulated container (1) equipped with an extremely low temperature refrigerator, there are provided a pressure sensor (21) for detecting a pressure within a product vessel (20) of the air separating device (4) and a negative pressure sensor (16) for detecting a negative pressure within the insulated vessel (1) respectively. When at least one of both sensors (21) (16) detects a freezing of an impurity gas contained in the supplied nitrogen gas by reaching a predetermined pressure, an operation of the extremely low temperature refrigerator is stopped depending on the detection by one of both the sensors.

10 Claims, 2 Drawing Sheets

SIMPLIFIED APPARATUS FOR PRODUCING LIQUID NITROGEN

BACKGROUND OF THE INVENTION

The present invention relates to an apparatus for producing liquid nitrogen simply which is supplied as a cold heat source to scientific appliances, for example a super-conducting magnetic type nuclear magnetic resonance device (SCM-NMR).

DESCRIPTION OF THE PRIOR ART

As an apparatus for producing the liquid nitrogen simply in a laboratory and the like, conventionally has been used such a one that includes a cold head of an extremely low temperature refrigerator projecting into a refrigerant storage vessel composed of insulated container from an opening formed at the upper end of the refrigerant storage vessel with the refrigerant storage vessel being supplied with a nitrogen gas in the gas phase separated from the atmosphere by means of an air separating device so that a cold heat generated in the cold head acts on the supplied nitrogen gas to liquefy it.

In this case, since a low boiling point gas such as a hydrogen and a helium gas or a moisture and a carbon dioxide gas in the atmosphere can not be removed completely by means of the air separating device, the nitrogen produced by the separating process in the air separating device results in being supplied into the insulated vessel in such a condition as to contain impurities such as the low boiling point gas, the moisture and the carbon dioxide gas. Further, since boiling points of the moisture and the carbon dioxide as the impurities are higher than that of the nitrogen comparatively, the moisture and the carbon dioxide gas are liquefied and frozen by the cold heat generated in the cold head of the extreme low temperature refrigerator to choke up a nitrogen gas supply passage in the refrigerant storage vessel. As a result, the extreme low temperature refrigerator falls into an idle running or a large back pressure is imposed to a compressor of the air separating device, so that disadvantageously a large load acts on the refrigerant storage vessel and the air separating device.

On one hand, the low boiling point gas such as the hydrogen and the helium gas in the atmosphere can not be liquefied by a cold heat temperature generated in the refrigerator for producing the liquefied nitrogen but resultantly stays in the gas phase in the upper portion of the insulated container. When an amount of the low boiling point gas staying in the insulated container increases, disadvantageously a layer of the low boiling point gas is interposed between the nitrogen gas and the cold head to hinder a transfer of the cold heat between the nitrogen gas and the cold head and to decrease a liquefied amount of the nitrogen gas.

SUMMARY OF THE INVENTION

An object of the first invention is to provide an apparatus for producing a liquid nitrogen which can prevent a large load from acting on a refrigerant storage vessel and an air separating device.

For accomplishing the object of the first invention, in an apparatus for producing a liquid nitrogen which is adapted to produce a liquefied nitrogen in an insulated container by supplying to an insulated container equippted with an extremely low temperature refrigerator a nitrogen gas separated from the atmosphere by means of an air separating device so as to liquefy the nitrogen gas within the insulated container for producing a liquefied nitrogen within the insulated container, a pressure sensing instrument is disposed in a product vessel of the air separating device as well as a negative pressure sensor is disposed in a refrigerant storage vessel. Wherein, an operation of a cold head of the extremely low temperature refrigerator is stopped and an alarm is presented depending on such a detection by the pressure sensing instrument that a pressure within the product vessel has reached a predetermined pressure or such a detection by the negative pressure sensor that a pressure within the refrigerant storage vessel has become negative.

An object of the second invention is to provide an apparatus for producing a liquid nitrogen which can have a high capability by automatically discharging a gas staying within a refrigerant storage vessel so as to eliminate a staying of a low boiling point gas within the refrigerant storage vessel.

For accomplishing the object of the second invention, in an apparatus for producing a liquefied nitrogen which is adapted to produce a liquefied nitrogen in an insulated container by supplying to an insulated container equipped with an extremely low temperature refrigerator a nitrogen gas separated from the atmosphere by means of an air separating device so as to liquefy the nitrogen gas within the insulated container for producing a liquefied nitrogen within the insulated container, a pressure conducting pipe is projected outside from a base flange closing an opening formed in the upper surface of the insulated container. Wherein, the pressure conducting pipe is provided with a safety valve for the insulated container a pressure in which is set to a pressure which is a little higher than the atmospheric pressure.

BRIEF DESCRIPTION OF THE DRAWINGS

The above and other important objects of the present inventions will be better understood from the following detailed description of preferred embodiments of the inventions, made with reference to the accompanying drawings, in which.

DETAILED DESCRIPTION OF PREFERRED EMBODIMENTS

Figure 1:
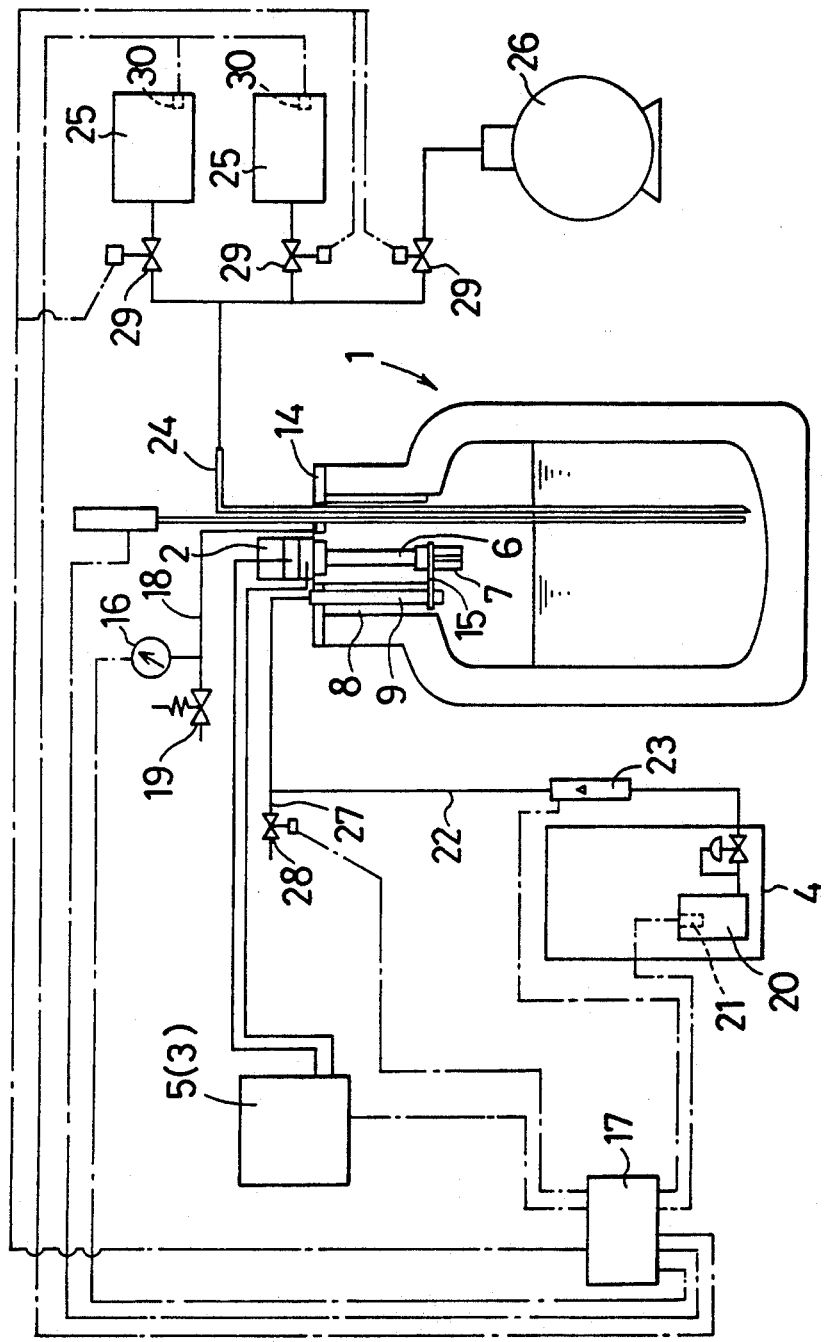
FIG. 1 is a schematic constructional view.
Figure 2:
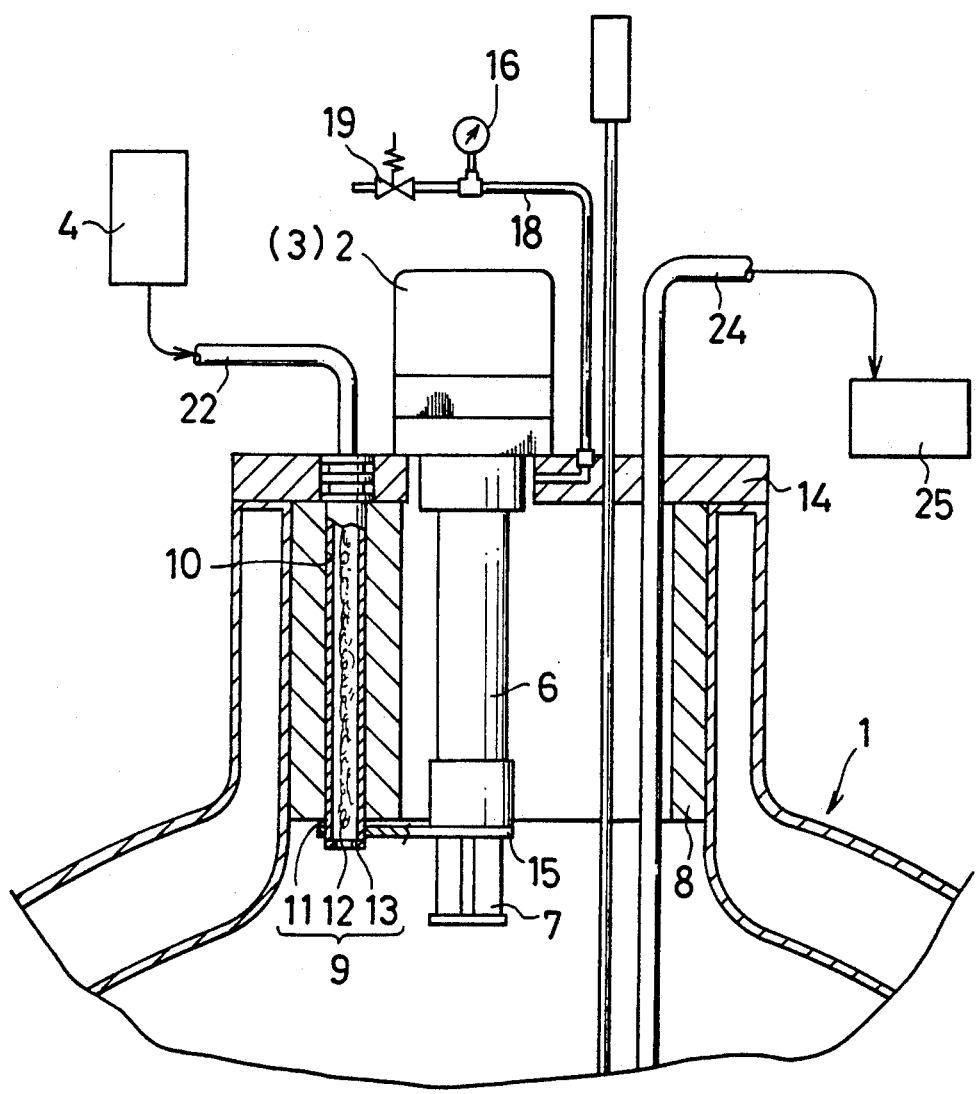
FIG. 2 is a vertical sectional view of a principal portion of an insulated container.

In FIGS. 1 and 2, an apparatus for producing a liquid nitrogen comprises a refrigerant storage vessel (1) composed of insulated container, an extremely low temperature refrigerator (3) having a cold head (2) disposed in an opening formed at the upper end of the refrigerant storage vessel (1) and a pressure oscillating type air separating device (4) adapted to supply a refrigerant gas to the refrigerant storage vessel (1). Incidentally, the air separating device (4) may be a molecular sieving type air separating device or a permeation type air separating device. The symbol (5) in Figs. designates a compressor unit of the extremely low temperature refrigerator (3).

A cold end (6) of the cold head (2) is so disposed as to enter the refrigerant storage vessel (1) from the opening formed at the upper end of the refrigerant storage vessel (1) while a condensation/liquefaction accelerating fin unit (7) is thermally connected to the cold end (6). The opening formed at the upper end of the refrigerant storage vessel (1) has a ring (8) made of insulating materials disposed so as to surround the cold end (6) while a mounting bore (10) for an impurity gas removing purifier (9) is formed vertically piercingly in the wall of the ring (8) made of the insulating materials.

The impurity gas removing purifier (9) has a casing (11) made of heat well-conductive materials such as brass an interior of which is filled with heat well-conductive metallic wool (12) such as copper wool and an entered leading end portion of the purifier (9) is equipped with a porous plate (13). This impurity gas removing purifier (9) is secured detachably and hermetically at its upper portion to a base flange (14) so arranged as to close the opening formed in the upper end of the refrigerant storage vessel (1) and fixedly attached by means of taper fitting at its lower end portion to a heat conduction plate (15) disposed along the lower end surface of the ring (8) made of the insulating materials (8). This heat conduction plate (15) is formed of heat well-conductive metal such as copper and aluminum and its one end portion is thermally connected to the cold end (6).

Further, the refrigerant storage vessel (1) is provided with a negative pressure sensor (16) comprising a pressure gauge with a contact or a pressure transducer. When this negative pressure sensor (16) detects a pressure within the refrigerant storage vessel (1) drops below a predetermined pressure, the detection signal is inputted to a control device (17) so that an output from the control device (17) stops an operation of the cold head (2) of the extremely low temperature refrigerator (3).

The negative pressure sensor (16) is mounted to a pressure conduction pipe (18) communicating with an inner peripheral surface of an opening into which the cold head (2) of the base flange (14) closing the upper end opening of the refrigerant storage vessel (1) is inserted while a safety valve (19) is disposed at a leading end portion of the pressure conduction pipe (18). An operational set pressure of this safety valve (19) is within a range of a gauge pressure of $0.3 \sim 0.5$ Kg/cm$^2$.

On one hand, a product vessel (20) of the air separating device (4) is provided with a pressure sensing instrument (21) such as a pressure gage with a contact and a transducer, and a flow sensor (23) is disposed in a nitrogen gas transfer pipe (22) interconnecting the product vessel (20) of the air separating device (4) and the impurity gas removing purifier (9) mounted to the refrigerant storage vessel (1). When the pressure sensing instrument (21) detects that a pressure within the product vessel (20) has dropped below a predetermined pressure due to a trouble or a performance lowering of the compressor of the air separating device (4), its detection signal is inputted to the control device (17) so that an output from the control device (17) can stop an operation of the cold head (2) of the extremely low temperature refrigerator (3) and gives an alarm.

The symbol (24) in FIGS. designates a liquid nitrogen transfer pipe. This liquid nitrogen transfer pipe (24) has its one end entered the refrigerant storage vessel (1) so as to reach even the bottom portion thereof and its other end connected to a liquid nitrogen utilizing machinery (25) such as a super-conducting magnetic type nuclear magnetic resonance device (SCM-NMR) or to the Dewar vessel (26) for taking out the liquid nitrogen. Accordingly, the liquid nitrogen transfer pipe (24) serves as a siphon tube to deliver the liquid nitrogen by the pressure within the refrigerant storage vessel (1).

The nitrogen gas transfer pipe (22) comprises a flexible pipe composed of a metal hose. This nitrogen gas transfer pipe (22) has a branch passage (27) branched out between the flow sensor (23) and the impurity gas removing purifier (9) while this branch passage (27) is provided at its leading end with a normally open type electromagnetic valve (28). The liquid nitrogen transfer pipe (24) connected to the respective liquid nitrogen utilizing machinery (25) is provided with a normally close type electromagnetic valve (29). Each electromagnetic valve (28)(29) is adapted to open and close depending on a command from the control device (17). The normally open type electromagnetic valve (28) disposed at the leading end portion of the branch passage (27) is adapted to close at the time of transfer of the liquid nitrogen to the utilizing machinery (25). During an operation of the extremely low temperature refrigerator (3), the nitrogen gas flowing through the nitrogen gas transfer pipe (22) is discharged in the proportion of around $20 \sim 30\%$ from the normally open type electromagnetic valve (28) disposed at the leading end of the branch passage (27). Incidentally, the liquid nitrogen transfer pipe (24) comprises an annealed copper pipe, and its external portion exposed outside the refrigerant storage vessel (1) is covered with insulating material having an external surface subjected to water-proof treatment.

At the time of starting this apparatus for producing the liquid nitrogen, firstly the air separating device (4) starts its operation, then the pressure within the product vessel (20) of the air separating device (4) increases so that the nitrogen gas starts to flow through the nitrogen gas transfer pipe (22). When the flow sensor (23) detects that an amount of the nitrogen gas flowing through the nitrogen gas transfer pipe (22) has reached a predetermined amount, the extremely low temperature refrigerator (3) starts its operation so as to produce the liquid nitrogen within the refrigerant storage vessel (1) by utilizing the nitrogen gas separated and purified from the air within the refrigerant storage vessel (1). Thereupon, since the moisture and the carbon dioxide gas of the impurity gasses containing the low boiling point gas and the moisture and the carbon dioxide gas which have not been removed completely in the air separating device (4) are brought into contact with the heat well-conductive metal wool (12) which has been cooled previously, during passing through the impurity gas removing purifier (9) so as to condense and attach to the wool (12) and then removed, resultantly the liquid nitrogen of high purity can be stored within the refrigerant storage vessel (1).

During the production of the liquid nitrogen by using the extremely low temperature refrigerator (3), when a gas introduction passage is choked by a freezing and so on, the interior of the refrigerant storage vessel (1) falls into a supercooled condition so that the pressure within the refrigerant storage vessel (1) becomes lower than a predetermined negative pressure. Thereupon, the operation of the cold head (2) of the extremely low temperature refrigerator (3) is stopped and the alarm is given depending on the signal from the negative pressure sensor (16) which has detected that lowering of the pressure within the refrigerant storage vessel (1).

Even when the pressure within the product vessel (20) is lowered by a trouble or a performance degradation of the air separating device (4), the similar operation is carried out because the flow of the nitrogen gas to be delivered from the product vessel (20) decreases at that time.

Thereby, since the impurity gas mixing with the nitrogen gas and having a higher boiling point than that of the nitrogen gas is removed by the impurity gas removing purifier (9), the liquefied nitrogen of high purity having no impurities mixed therein is stored within the refrigerant storage vessel (1). Further, since the operation of the cold head (2) of the extremely low temperature refrigerator (3) is stopped and the alarm is given depending on the detection of the lowering of the pressure within the refrigerant storage vessel (1) below the predetermined negative pressure by the negative pressure sensor (16), which lowering might be caused by a decreasing of a supply flow of the nitrogen gas due to a trouble of the air separating device (4) or a freezing of the impurity contained in the nitrogen gas introduction system, it becomes possible to stably operate the apparatus for producing the liquid nitrogen for a long time.

The transfer of the liquid nitrogen from the refrigerant storage vessel (1) to the liquid nitrogen utilizing machinery (25) is carried out by introducing the nitrogen gas into the refrigerant storage vessel (1) under such a condition that the operation of the extremely low temperature refrigerator (3) is stopped. That is, when a liquid nitrogen requiring signal is inputted to the control device (17) from a refrigerant supply sensor disposed in the liquid nitrogen utilizing machinery (25) under the stop condition of the operation of the extremely low temperature refrigerator (3), the normally open type electromagnetic valve (28) disposed in the branch passage (27) of the nitrogen gas transfer pipe (22) is closed as well as the normally close type electromagnetic valve (29) disposed in the liquid nitrogen transfer pipe (24) is closed by a command from the control device (17). Then, the pressure within the refrigerant storage vessel (1) is increased by supplying the whole amount of the nitrogen gas from the air separating device (4) into the refrigerant storage vessel (1), so that the liquid nitrogen is pushed out by the increased pressure within the refrigerant storage vessel (1) to be supplied automatically to the liquid nitrogen utilizing machinery (25). Then, when the refrigerant supply sensor detects that the amount of the liquid nitrogen within the liquid nitrogen utilizing machinery (25) has reached a predetermined amount, the normally open type electromagnetic valve (28) disposed in the branch passage (27) of the nitrogen gas transfer pipe (22) is opened as well as the normally close type electromagnetic valve (29) disposed in the liquid nitrogen transfer pipe (24) is closed, so that the supply of the liquid nitrogen is stopped.

Since the low boiling point gas such as hydrogen, helium, neon, xenon and krypton mixing with the nitrogen gas flowing into the refrigerant storage vessel (1) is not liquefied by a cold heat generated in the cold end (6) in spite of entering the refrigerant storage vessel (1), it stays in the upper portion of the refrigerant storage vessel (1) in the gas phase as it is. But, such a staying gas is discharged together with the nitrogen gas from the safety valve (19) during transfer of the liquid nitrogen to the liquid nitrogen utilizing machinery (25). That is, when the liquid nitrogen is transferred as mentioned above, the nitrogen gas is supplied to the refrigerant storage vessel (1) under the stop condition of the operation of the extremely low temperature refrigerator (3). But, when the nitrogen gas is supplied to the refrigerant storage vessel (1) under the stop condition of the operation of the extremely low temperature refrigerator (3), the pressure within the refrigerant storage vessel (1) increases so as to reach a set operational pressure of the safety valve (19) and then the safety valve (19) operates so as to discharge the nitrogen gas from the refrigerant storage vessel (1). Thereupon, since the low boiling point gas tends to stay in the upper portion of the refrigerant storage vessel (1), the low boiling point gas staying in the refrigerant storage vessel (1) is discharged together with the nitrogen gas from the refrigerant storage vessel (1) by the operation of the safety valve (19).

Accordingly, it becomes possible to eliminate the staying of the low boiling point gas which is apt to be not liquefied at a temperature of the nitrogen, within the refrigerant storage vessel (1), so that the liquid nitrogen can be produced efficiently.

On the other hand, in order to take a countermeasure for a trouble of the refrigerant supply sensor or of the electromagnetic valve, an overflow sensor (30) is disposed in the liquid nitrogen utilizing machinery (25). An overflow detection signal from the overflow sensor (30) is adapted to be inputted to the control device (17) so that the normally open type electromagnetic valve (28) disposed in the branch passage (27) of the nitrogen gas transfer pipe (22) is opened by an output from the control device (17) so as to release a pressurization within the refrigerant storage vessel (1) and to stop the transfer of the liquid nitrogen in an emergency.

When the impurity gas removing purifier (9) is choked by a freezing of the impurity gas, the choked purifier (9) is detached from the refrigerant storage vessel (1) and then the refreshed purifier (9) is mounted to the refrigerant storage vessel (1). The detached impurity gas removing purifier (9) is connected to a gas discharge port branched off from the nitrogen gas transfer pipe (22) so that the moisture and the carbon dioxide gas caught in the impurity gas removing purifier (9) can be purged off by releasing a portion of the nitrogen gas which has separated and purified in the air separating device (4) to refresh the purifier (9).

As many different embodiments will be obvious to those skilled in the art, some of which have been disclosed or referred to herein, it is to be understood that the specific embodiments of the present invention as presented herein are intended to be by way of illustration only and are not limiting on the invention, and it is to be understood that such embodiments changes, or modifications may be made without departing from the spirit and scope of the invention as set forth in the claims appended hereto.

What is claimed is:

1. An apparatus for producing liquid nitrogen comprising:
   a refrigerant storage vessel composed of an insulated container, said refrigerant storage vessel including an opening formed at an upper end thereof;
   an extremely low temperature refrigerator having a cold head associated therewith, said cold head projecting into the opening formed in said refrigerant storage vessel;
   means for producing a supply of nitrogen gas including a device for separating nitrogen gas from air, the nitrogen gas being supplied to said refrigerant storage vessel in a gaseous phase such that the nitrogen gas is liquified by a cold heat supplied from said cold head, said device including a product vessel;

a pressure sensing instrument disposed in said product vessel;

a negative pressure sensor connected to within said refrigerant storage vessel; and control and indication means, responsive to said pressure sensing instrument and said negative pressure sensor, for interrupting operation of said cold head and providing an alarm upon detection by said pressure sensing instrument that a pressure within said product vessel has lowered to a predetermined pressure or upon detection by said negative pressure sensor that a pressure within said refrigerant storage vessel has lowered below a predetermined negative pressure.

2. An apparatus for producing liquid nitrogen as defined in claim 1, further comprising:

insulating material surrounding said cold head within said storage vessel; and an impurity gas removing purifier mounted to a bore vertically piercing said insulating material whereby a refrigerant gas can be supplied from said air separating device into said refrigerant storage vessel through said impurity gas removing purifier.

3. An apparatus for producing liquid nitrogen as defined in claim 2, wherein said impurity gas removing purifier comprises a casing, the casing being made of a heat conductive material, filled with heat conductive metallic wool and provided at its lower end with a porous plate.

4. An apparatus for producing liquid nitrogen as defined in claim 2, wherein said impurity gas removing purifier is thermally connected to a cold end of said cold head.

5. An apparatus for producing liquid nitrogen as defined in claim 1, further comprising a condensation/liquefaction accelerating fin unit thermally connected to a cold end of said cold head.

6. An apparatus for producing liquid nitrogen comprising:

a refrigerant storage vessel composed of an insulated container, said refrigerant storage vessel including an opening formed at an upper end thereof;

a base flange closing the opening formed at the upper end of said refrigerant storage vessel;

an extremely low temperature refrigerator having a cold head associated therewith, said cold head projecting into said refrigerant storage vessel through said base flange;

means for producing a supply of nitrogen gas including a device for separating nitrogen gas from air, the nitrogen gas being supplied to said refrigerant storage vessel in a gaseous phase such that the nitrogen gas is liquified by a cold heat supplied from said cold head;

a pressure conduction pipe extending out of said refrigerant storage vessel through an opening formed in said base flange, said pressure conduction pipe including a leading end portion located outside of said refrigerant storage vessel;

a safety valve provided at the leading end portion of said pressure conduction pipe, said safety valve having an operational pressure set to a pressure slightly higher then atmospheric pressure; and control means for discharging nitrogen gas containing an incondensible gas from within said refrigerant storage vessel when a pressure within said refrigerant storage vessel reaches the operational pressure of said safety valve.

7. An apparatus for producing liquid nitrogen as defined in claim 6, wherein the operational pressure of said safety valve is within a range of $0.3 \sim 0.5$ $kg/cm_2$ in gauge pressure.

8. An apparatus for producing liquid nitrogen as defined in claim 6, further comprising a negative pressure sensor in communication with said pressure conduction pipe.

9. An apparatus for producing liquid nitrogen as defined in claim 6, further comprising a condensation/liquefaction accelerating fin unit thermally connected to a cold end of said cold head.

10. An apparatus for producing liquid nitrogen as defined in claim 6, further comprising:

a liquid nitrogen utilizing machine;

means for transferring liquid nitrogen from within said refrigerant storage vessel to said machine; and an overflow sensor disposed in said machine, said control means being responsive to overflow information from said overflow sensor to shut off the transfer of liquid nitrogen by said transferring means in an emergency.

* * * * *